United States Patent
Föhl

[11] Patent Number: 5,730,384
[45] Date of Patent: Mar. 24, 1998

[54] COUPLING BETWEEN THE BELT DRUM OF A BELT RETRACTOR AND A BELT PRETENSIONER ROTARY DRIVE

[75] Inventor: Artur Föhl, Schorndorf, Germany

[73] Assignee: TRW Occupant Restraint Systems GmbH, Alfdorf, Germany

[21] Appl. No.: 704,666

[22] PCT Filed: Jan. 18, 1996

[86] PCT No.: PCT/EP96/00191

§ 371 Date: Sep. 12, 1996

§ 102(e) Date: Sep. 12, 1996

[87] PCT Pub. No.: WO96/22200

PCT Pub. Date: Jul. 25, 1996

[30] Foreign Application Priority Data

Jan. 19, 1995 [DE] Germany .................. 295 00 807 U

[51] Int. Cl.⁶ ........................................... B60R 22/46
[52] U.S. Cl. ................................................ 242/374
[58] Field of Search .......................... 242/374, 383.2, 242/383.5; 280/806; 297/478, 480

[56] References Cited

U.S. PATENT DOCUMENTS 4,428,846  1/1984  Fohl .................................... 242/374
4,568,037  2/1986  Kawaguchi et al. .
4,991,790  2/1991  Fohl et al. ........................... 242/374

FOREIGN PATENT DOCUMENTS 2491340  4/1982  France .
4304492  8/1993  Germany .
210743   3/1990  Japan .
569793   3/1993  Japan .
624294   2/1994  Japan .
6171460  6/1994  Japan .
295412   8/1928  United Kingdom .
793920   4/1958  United Kingdom .
2268678  1/1994  United Kingdom .

Primary Examiner—John M. Jillions
Attorney, Agent, or Firm—Tarolli, Sundheim, Covell, Tummino & Szabo

[57] ABSTRACT

The coupling between the belt drum of a belt retractor and a belt pretensioner rotary drive renders possible the manufacture of the functional parts of a metallic light constructional material such as a light alloy. The belt drum (12) possesses a molded externally toothed coupling wheel (16). With the output shaft (20) of the belt pretensioner rotary drive (18) a drive disk (22) is connected, which bears two pivotally mounted coupling pawls (28). In a neutral or rest position thereof these coupling pawls are held by a return spring clear of the periphery of the coupling wheel (16) and may be pivoted inward into an engagement position in engagement with such coupling wheel.

9 Claims, 5 Drawing Sheets

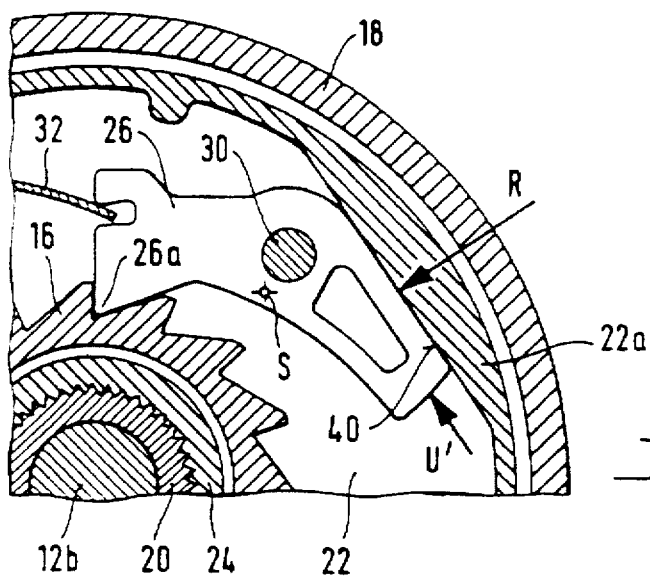
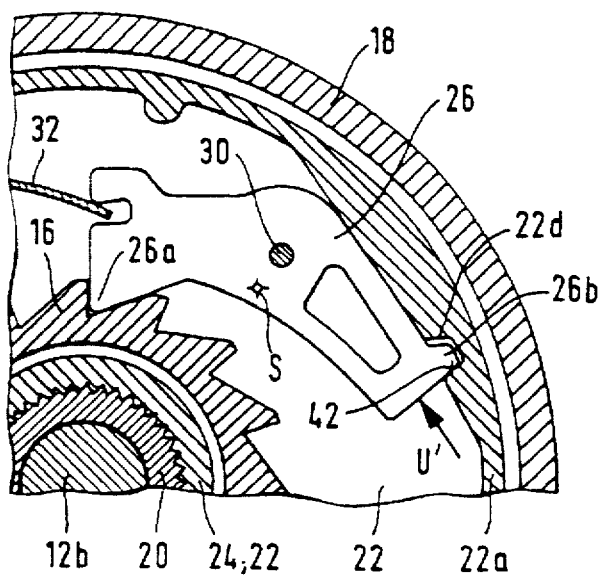
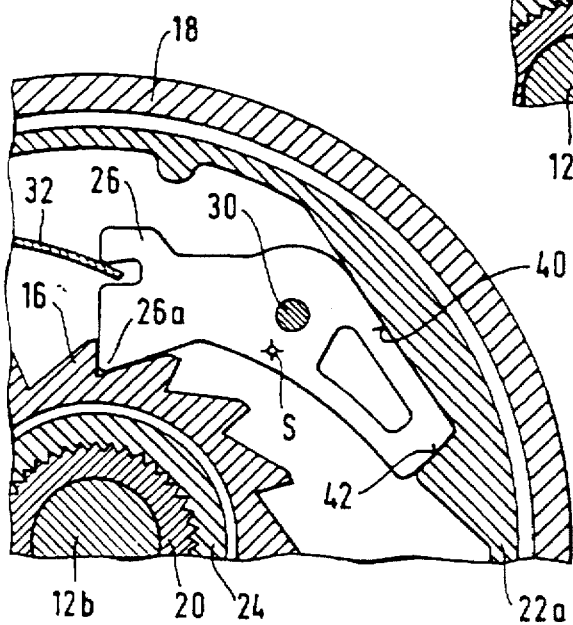

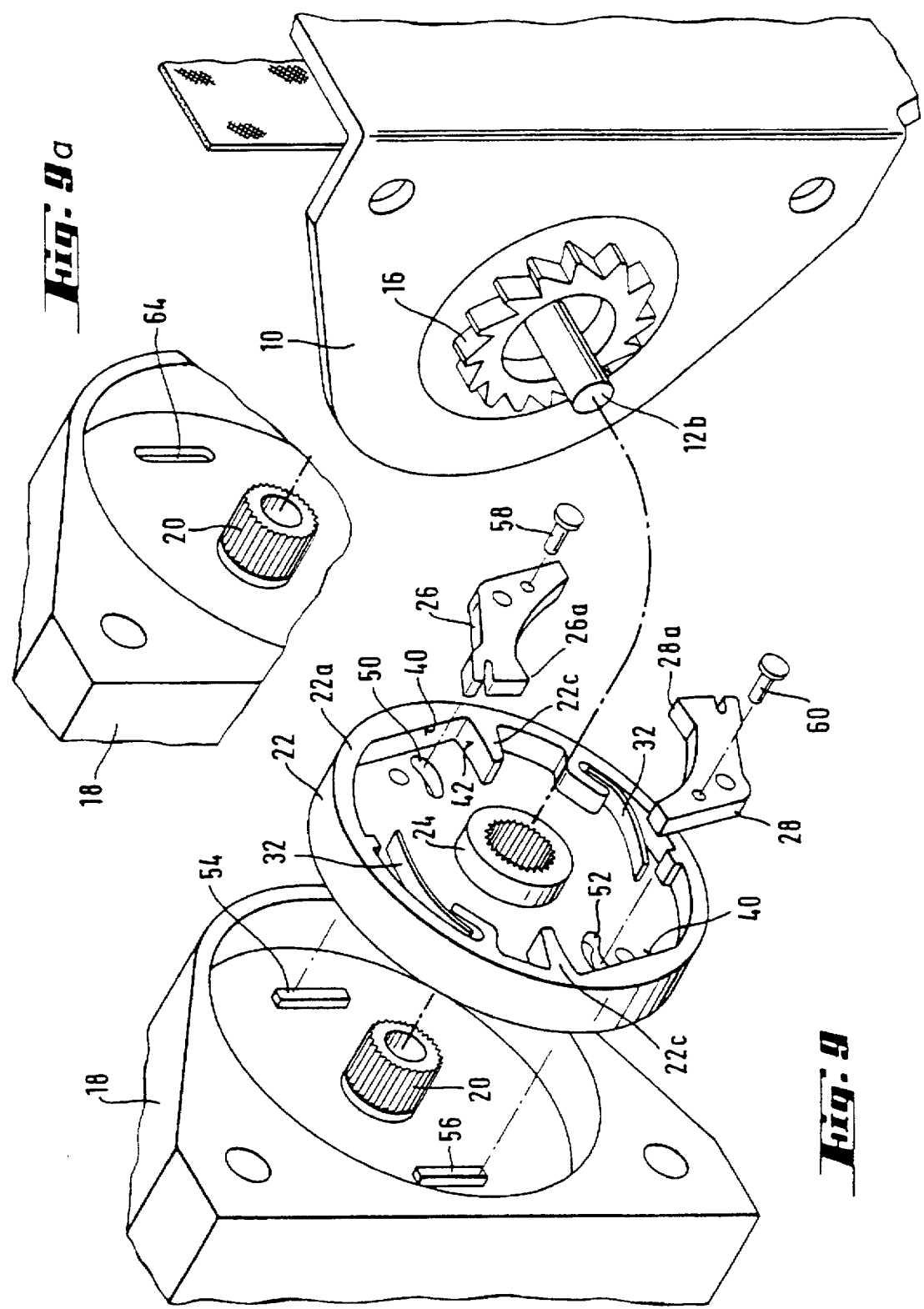

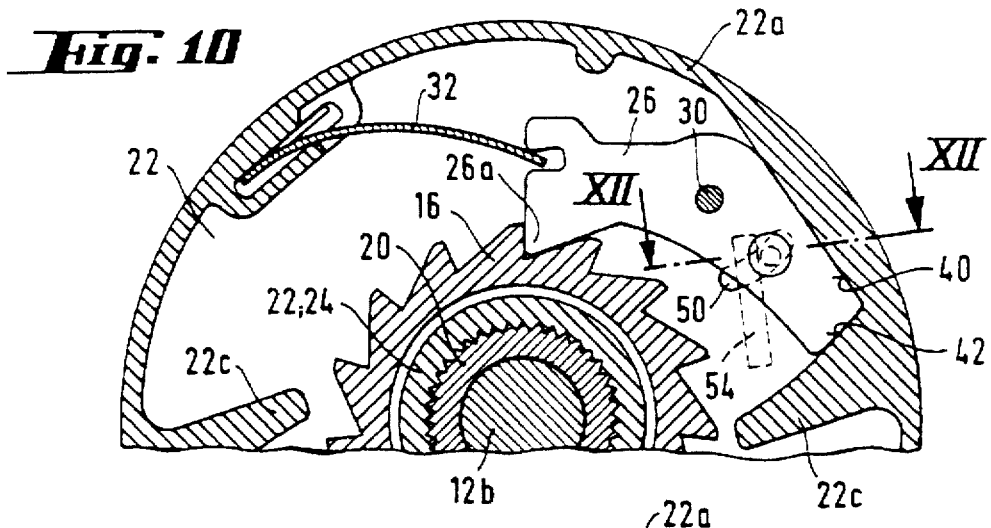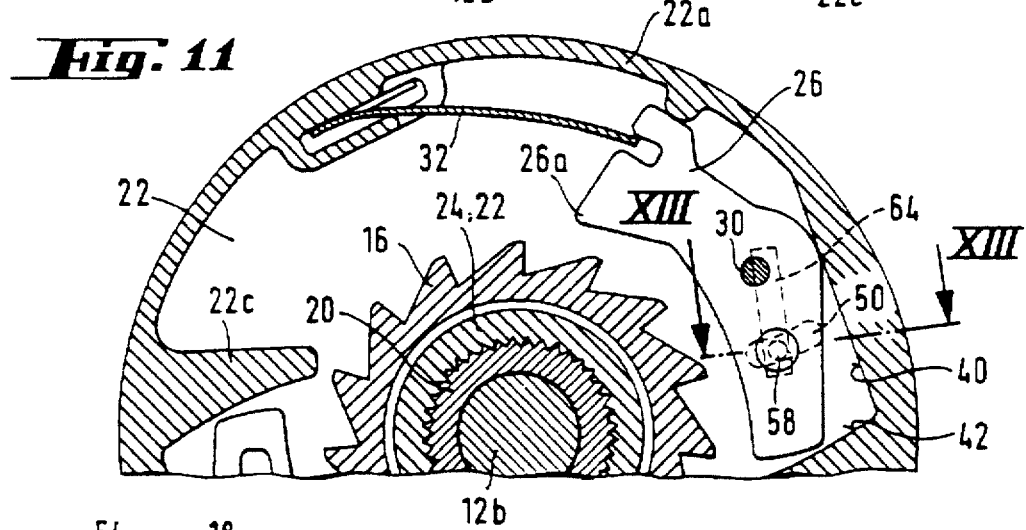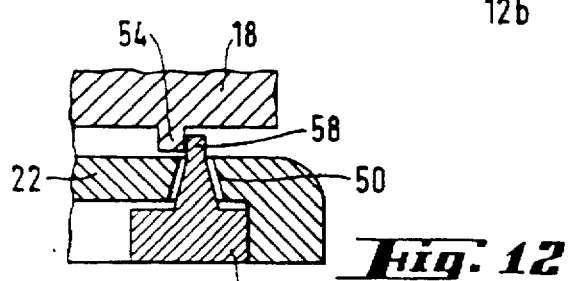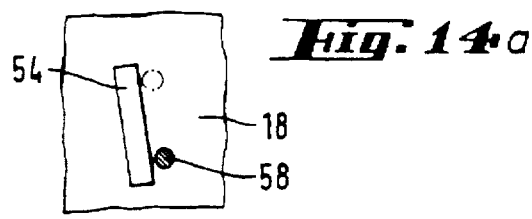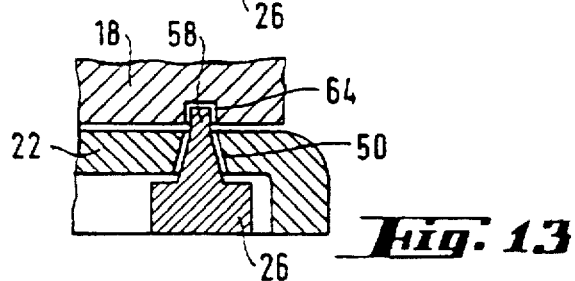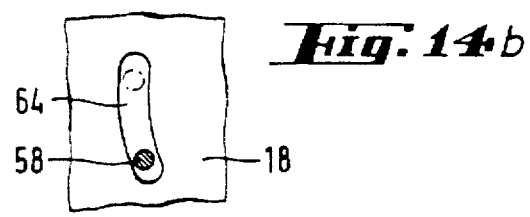

COUPLING BETWEEN THE BELT DRUM OF A BELT RETRACTOR AND A BELT PRETENSIONER ROTARY DRIVE

The invention relates to a coupling between the belt drum of a belt retractor and a belt pretensioner rotary drive, which has an output shaft.

In order to ensure that normal rotation of the belt drum of a belt retractor is not hindered by the rotary drive of the belt pretensioner the belt drum is kept uncoupled from the belt pretensioner rotary drive until the latter is activated. On the other hand the belt drum should be able to be freely rotated after the safety belt has been pretensioned to ensure that the normal take-up and locking function of the belt retractor is available again, and for instance following a slight accident, that the vehicle user is able to re-fasten his or her safety belt and drive to a repair facility.

Among the various possible designs of couplings ratchet couplings have the advantage of being able to be simply released again by rocking the coupling pawls back into their initial position. In the case of known couplings the coupling pawls are surrounded by an internally toothed coupling wheel and are pivoted outward in order to produce the coupling connection. So far it has been considered to be an advantage for the coupling annulus or ring to be arranged radially outside the coupling pawls, since there is more space available for the teeth radially outside than inside and larger teeth are possible while having a finer tooth pitch.

The invention is based on the fact that force transmission from a coupling pawl to a coupling wheel placed radially outside leads to problems to the extent that the coupling wheel is subjected to a locally concentrated load with a high radial component. The peripheral acceleration of a belt pretensioner rotary drive reaches values of the order of 1000 g and more so that the components of the coupling are subjected to extremely high loads. Such components have consequently always been manufactured of materials such as steel, with a high mechanical strength. These materials are however not only expensive but also involve a large mass, something which in turn leads to high inertial forces, which must be overcome by having a high drive power.

The invention is to provide a coupling, whose components are subject to lesser loads so that they may be produced using a light metallic constructional material. In accordance with the invention the belt drum possesses an externally toothed coupling wheel; on the output shaft a drive disk is connected, which bears at least one pivotally mounted coupling pawl; the coupling pawl is held by a return spring in a neutral position clear of the periphery of the coupling wheel and is able to be pivoted inward into an engagement position in engagement with the coupling wheel. In this coupling the coupling operation takes place radially from the outside to the inside, the internally placed coupling wheel being predominantly loaded in the peripheral direction. Radial components which are still present lead to an easily handled thrust load of the coupling wheel from the outside to the inside. For the components of the coupling it is possible to employ lighter materials of lower strength so that besides a compact design there is also a reduction in inertial forces and a reduction in the drive power required.

A further easing off of requirements as regards mechanical strength of the coupling pawl and its bearing means is achieved by an advantageous further development of the invention, in accordance with which in the engaged setting the coupling pawl is supported by a surface of a support structure on the periphery of the drive disk, more particularly with respect to forces directed in the radial direction of the disk. In the preferred embodiment this support structure possesses a high mechanical rigidity, since it is constituted by a continuous ring which is formed on the periphery of the drive disk and extends axially from the disk body.

In an advantageous embodiment the extremely high angular acceleration occurring on activation of the rotary drive of the belt pretensioner is utilized for control of the coupling pawl by using its inertia. For this purpose the center of gravity of the coupling pawl is placed radially inward of its pivot axis. In the preferred embodiment there is however in addition a positive control of the coupling pawl by a positively acting guide, which possesses a cam and a cam follower element able to be shorn off in order to ensure that the coupling pawl is pivoted along an extremely short path of, for example, one fourth to one half of the tooth pitch on the coupling wheel, into the engagement setting.

Further advantages and features of the invention will be understood from the ensuing description of several embodiments thereof and from the drawings, to which reference is had.

FIGS. 3 through 7 are part views showing several embodiments of a coupling pawl with its support means.

FIG. 9 shows an exploded view of an advantageous embodiment of the coupling.

FIG. 9a shows a modified design of this coupling.

FIG. 10 diagrammatically shows the coupling pawl in the engaged setting.

FIG. 11 diagrammatically shows the coupling pawl in the neutral setting.

FIG. 12 shows a section taken on the line XII—XII of FIG. 10.

FIG. 13 shows a further possible form on the basis of the sectional view of FIG. 12.

FIG. 14 shows two embodiments of a cam for positively driving the coupling pawl.

Figure 1:
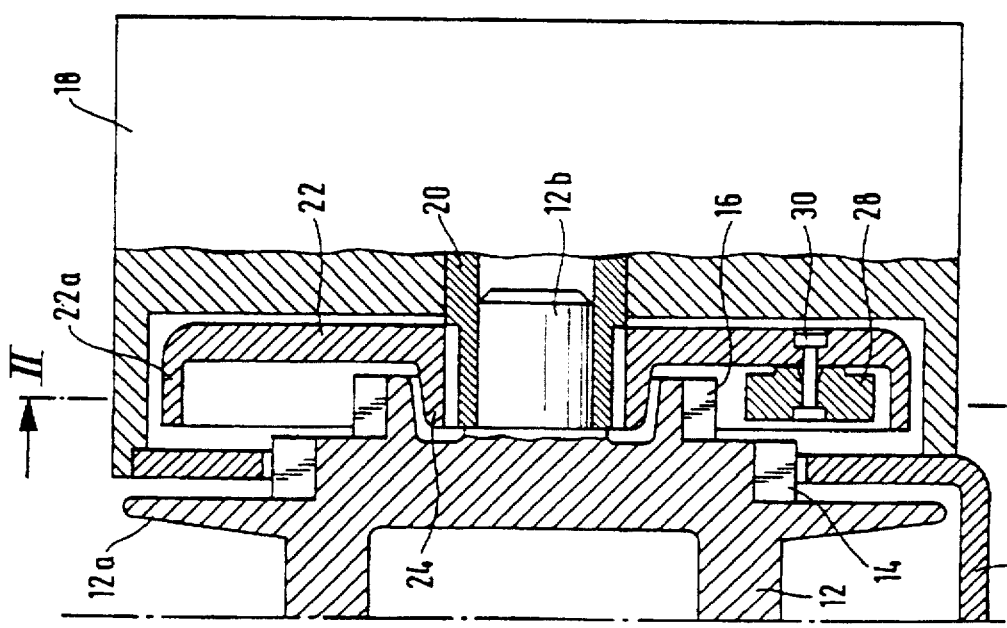
FIG. 1 shows a part section of a coupling between the belt drum of a belt retractor and the rotary drive of a belt pretensioner.

In FIG. 1 only a part of the housing 10, together with the belt drum 12 rotatably mounted therein, of a retractor for safety belts in vehicles is illustrated. In a conventional fashion the belt drum 12 is manufactured of light alloy and possesses molded ratchet teeth 14. An annular, externally toothed coupling wheel 16 is also formed on the belt drum 12. The belt drum 12 is provided with flanges 12a, ratchet teeth 14 and a molded on coupling wheel 16 and is produced by injection casting.

On the lateral limb, illustrated in FIG. 1, of the housing 10 a belt pretensioner rotary drive is mounted, which is generally referenced 18. This belt pretensioner rotary drive 18, which need not be described in detail here, possesses a hollow externally splined output shaft 20 pointing toward the belt drum 12, in whose interior a bearing journal 12b of the belt drum 12 is accommodated. On the output shaft 20 a drive disk 22 is mounted with an interlocking fit by means of a molded on, bushing-like and internally splined hub 24. This drive disk 22 is provided on its outer periphery with a molded, annular support structure 22a. On the drive disk 22, on the side facing the belt drum 12, two coupling pawls 26 and 28 are respectively pivotally mounted on a bearing pin 30. The coupling pawls 26 and 28 are approximately diametrally opposite one another but, as related to the teeth of the coupling wheel 16, are mutually offset by half the pitch. The coupling pawls 26 and 28 are respectively urged by a strip spring 32, anchored to the support structure 22a, into a neutral or resting position in which the pawl tips 26a and, respectively, 28a are at a radial distance from the periphery of the coupling wheel 16. As shown in FIG. 1 the coupling wheel 16 surrounds the hub 24 of the drive disk 22 and the annular support structure 22a surrounds the coupling wheel 16 so that the space available in the axial direction is properly utilized.

The coupling pawls 26 and 28 as well as the drive disk 22 are manufactured of a light metallic constructional material and more particularly of light alloy, preferably using injection casting.

Figure 2:
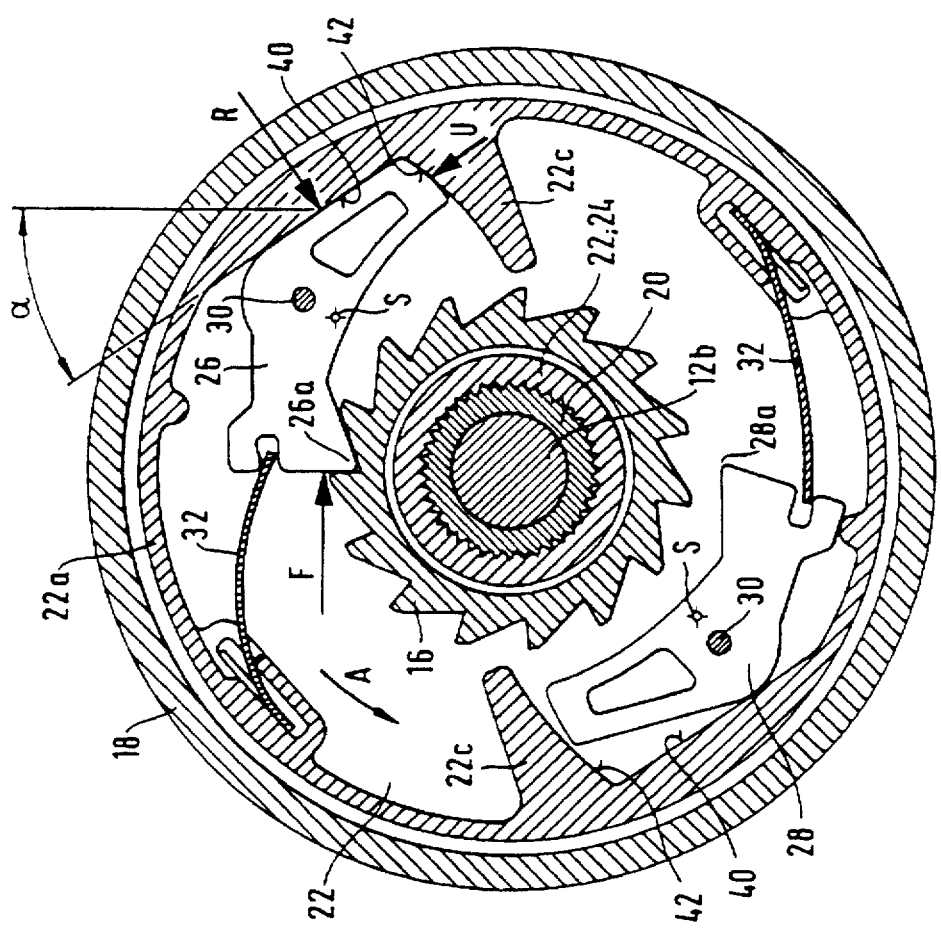
FIG. 2 shows a sectional view taken on the line II—II of FIG. 1.

FIG. 2 shows the coupling pawl 26 in the engaged setting and the coupling pawl 28 in the neutral setting. Said neutral setting is set by a radially inwardly directed projection on the support structure 22a. The center of gravity S of the ratchet pawls 26 and 28 is in each case placed radially inward from the axis of the bearing pin 30. The consequence of this is that the coupling pawls 26 and 28 tend to be pivoted into their engagement position owing to the abrupt angular acceleration of the drive disk 22 in the direction of the arrow A in FIG. 2 because of inertial forces, such acceleration occurring on activation of the belt pretensioner rotary drive 18.

For each coupling pawl 26 and 28 the support structure 22a forms both a radial support surface 40 and also a support surface 42 taking up forces acting in the peripheral direction. The forces involved are indicated in FIG. 2. Firstly between the teeth of the coupling wheel 16 and the tip 26a of the coupling pawl 26 the support force F will take effect, which in its orientation is approximately tangential to the coupling wheel 16. In the coupling pawl 26 this force F leads to there being a radial component R and a component U in the peripheral direction. The support surface 42 is formed on a radially inwardly directed support rib 22c on the support structure 22 and has a radius the same as the radius of the adjacent end of the lever arm of the coupling pawl 26. The result is hence a large-area engagement between this end of the coupling pawl 26 and the said support surface 42 to take up the force U. The force R is taken up by the flat support surface 40.

Figure 8:
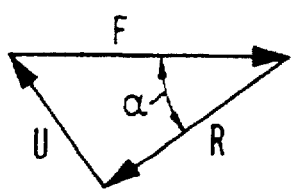
FIG. 8 shows a graph of forces to explain the support forces occurring at the coupling pawl.

FIG. 8 shows a diagram for the forces involved. There is the angle α between the forces F and R. In this approach to the forces friction is not yet taken into account. In fact friction occurs on the support surface 40 opposing the U force component with the result that the support rib 22c is relieved. Same only has to take up the force U' equal to R·sinα−R·μ, μ being the coefficient of friction on the support surface 42.

As shown in FIG. 2 the coupling pawl 28 has its end remote from the pawl tip 28a at a small distance from the associated support rib 22c in order not to obstruct pivoting of the coupling pawl into the engagement setting. The bearing pins 30 are able to slightly yield so that support on the support ribs 22c takes place at an increased load.

When during activation of the belt pretensioner rotary drive 18 the drive disk 22 is accelerated in the direction of the arrow A, the two coupling pawls 26 and 28 are pivoted by inertial forces toward the coupling wheel 16. The offset between the coupling pawls in the periphery means that at all times one pawl tip is present in a tooth gap on the coupling wheel, even if the other one should be riding on a tooth tip. The coupling pawls 26 and 28 and the support therefor are so dimensioned that each thereof can by itself transmit the forces occurring. The drive disk 22 is in the present case coupled with the coupling wheel 16 in such a manner as to prevent relative rotation and owing to such wheel entrains the belt drum 12 with the result that the belt webbing is drawn taut. As soon as this action has been completed the coupling pawls 26 and 28 are pivoted back into their neutral position by the strip springs 32. The belt drum 12 is disconnected again from the belt pretensioner rotary drive 18 and may be turned freely.

In the modified form of embodiment illustrated in FIG. 3 the bearing pin 30 is so dimensioned that it may also take up the peripheral forces U' remaining after deduction of friction. The overwhelming support force is the radial force R due to the support surface 40 of the support structure 22a.

In the modified form of embodiment of FIG. 4 the free end of the coupling pawl 26 has an outwardly directed cam 26b formed thereon fitting into a notch 22d in the support structure 22c. This notch constitutes a support surface 42 taking up the peripheral force U' which remains after friction has been deducted.

In the modified form of embodiment of FIG. 5 the support surface 42 is constituted by a step of the support structure 22a rather than by a support rib 22c.

Figure 6:
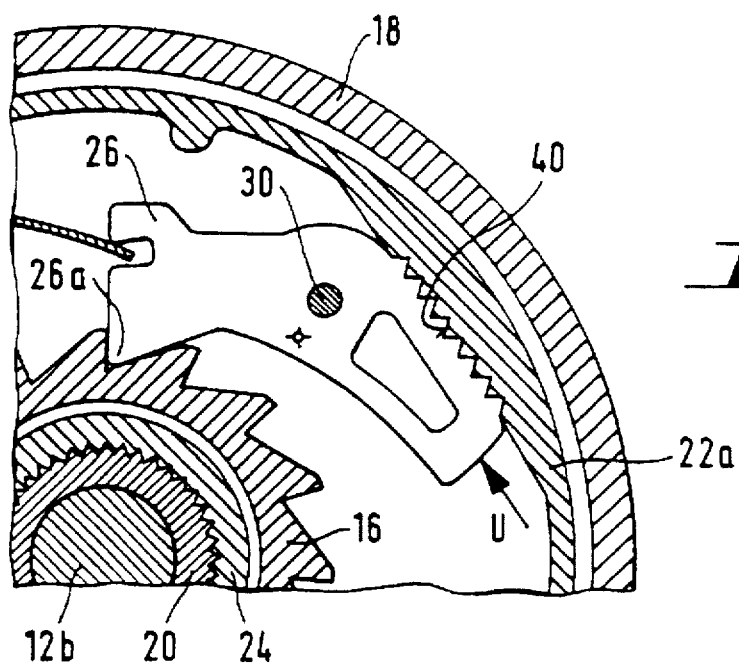

In the modified design of FIG. 6 the support surface 40 on the support structure 22a and the corresponding mating surface on the ratchet pawls 26 and 28 are provided with mutually corresponding serrations. These serrations also take up the peripheral component U.

Figure 7:
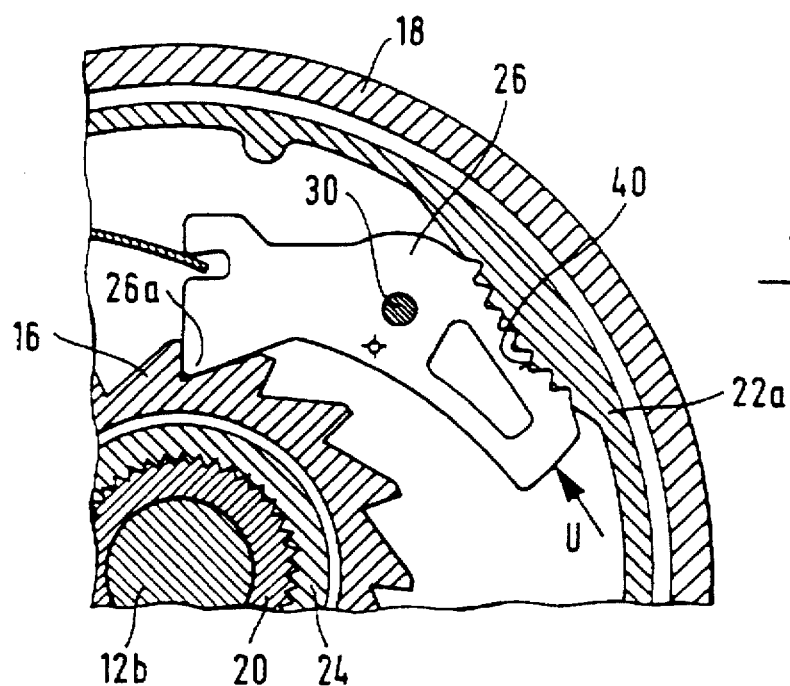

A further possible form of this design is illustrated in FIG. 7. Instead of serrations arcuate, corrugated interlocking structures are provided. Same serve to take up both the radial support force and also the peripheral force U.

In all embodiments the bearing pins 30 substantially only have to deal with low guiding forces during the pivoting of the coupling pawls 26 and 28.

In the embodiments depicted in FIGS. 9 through 14 the pivoting of the coupling pawls 26 and 28 is caused both by inertial forces and also by a positive guiding action. This positive guiding action ensures that within a predetermined angular movement of the drive disk 22 the coupling pawls are pivoted out from their neutral position into their engagement position. Such angular movement will preferably be equal to only a fraction of the tooth pitch of the coupling wheel 16, as for example one fourth to one half of the tooth pitch. This means that the coupling operation will also be completed before the drive disk 22 has reached a high angular velocity.

As shown in FIG. 9 adjacent to the bearing regions for the coupling pawls 26 and 28 the drive disk 22 possesses two kidney-shaped windows 50 and 52. In the position opposite to such windows 50 and 52 two rigid guide bars 54 and 56 are mounted on the front end of the belt pretensioner rotary drive 18. In the coupling pawls 26 and 28 a respective pin 58 and 60 is set, which extends through the corresponding window 50 and, respectively, 52 to engage the corresponding guide bar 54 and 56. The guide bars 54 and 56 constitute a drive cam run up against by the pins 58 and 60 when the drive disk 22 commences to rotate with the result that the coupling pawls 26 and 28 are pivoted in the desired direction. Once the coupling operation has been completed the pins 58 and 60 are shorn off.

In the modified embodiment illustrated in FIG. 9a instead of the guide bars 54 and 56 a groove 64 is provided which however also constitutes a drive cam for the corresponding pin 58 fitting into it.

FIGS. 10 and 12 show the embodiment in accordance with FIG. 9, whereas FIGS. 11 and 13 show that in accordance with FIG. 9a.

The drive cam formed by the guide bars 54 and 56 and, respectively, the groove 64 does not have to be in the form of a straight line; it may also be curved, as shown in FIG. 14, in order to optimize the pivoting motion of the coupling pawls 26 and 28.

I claim:

1. In a belt retractor which has a frame, a belt drum rotatably mounted in said frame and a belt pretensioner rotary drive with a driving shaft, a coupling device for selectively coupling said belt drum and with said driving shaft for joint rotation, said coupling device comprising:
   a drive disk mounted on said driving shaft for joint rotation;
   an externally toothed coupling wheel connected to said belt drum for joint rotation;
   at least one coupling pawl;
   a pivot bearing on said drive disk for pivotally mounting said pawl on said drive disk;
   a return spring biasing said coupling pawl to a position out of engagement with said coupling wheel; and
   a peripheral rim on said drive disk provided with a support structure for said pawl;
   said pivot bearing adapted to yield under load in a peripheral direction of said drive disk to allow said pawl to bear against said support structure.

2. The coupling device of claim 1 wherein said support structure has a first surface portion on which said pawl bears under the action of peripheral forces and a second surface portion on which said pawl bears under the action of radial forces.

3. The coupling device of claim 1 wherein said peripheral rim is formed by a continuous ring laterally projecting from said drive disk.

4. The coupling device of claim 3 wherein said ring is integrally molded with said drive disk from a metallic material.

5. The coupling device of claim 1 wherein said drive disk has an integral cylindrical hub splined to said driving shaft.

6. The coupling device of claim 5 wherein said coupling wheel extends around said hub with radial clearance.

7. The coupling device of claim 1 wherein said pawl has a center of gravity which is radially inward from the pivot bearing.

8. The coupling device of claim 1 wherein a cam and cam follower are provided on said frame and said pawl for forcibly moving said pawl into engagement with said coupling wheel upon rotation of said drive disk relative to said frame.

9. The coupling device of claim 8 wherein said cam and cam follower include a shear pin.

* * * * *